(12) United States Patent
Jono

(10) Patent No.: US 7,678,944 B2
(45) Date of Patent: *Mar. 16, 2010

(54) PROCESS FOR PRODUCTION OF POLYETHERS AND POLYMERS

(75) Inventor: Hideharu Jono, Akashi (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/666,817

(22) PCT Filed: Oct. 28, 2005

(86) PCT No.: PCT/JP2005/019857

§ 371 (c)(1),
(2), (4) Date: May 1, 2007

(87) PCT Pub. No.: WO2006/049088

PCT Pub. Date: May 11, 2006

(65) Prior Publication Data

US 2008/0125563 A1 May 29, 2008

(30) Foreign Application Priority Data

Nov. 1, 2004 (JP) .............................. 2004-318604

(51) Int. Cl.
*C07C 41/00* (2006.01)

(52) U.S. Cl. ........................ 568/579; 568/621; 556/445; 556/446; 528/14; 528/31

(58) Field of Classification Search ............. 528/14–15, 528/31; 556/445–446; 568/621, 579
See application file for complete search history.

(56) References Cited

U.S. PATENT DOCUMENTS

| 5,248,833 | A | 9/1993 | Hinney et al. |
| 5,986,122 | A | 11/1999 | Lewis et al. |
| 6,248,915 | B1 | 6/2001 | Ito et al. |
| 6,503,995 | B2 | 1/2003 | Tsuji et al. |
| 6,541,593 | B1 * | 4/2003 | Jyono et al. .................... 528/15 |
| 7,342,045 | B2 * | 3/2008 | Vivier et al. ................. 514/474 |
| 2006/0211799 | A1 | 9/2006 | Hattori et al. |

FOREIGN PATENT DOCUMENTS

| JP | 6-200013 A | 7/1994 |
| JP | 8-41252 A | 2/1996 |
| JP | 10-212349 A | 8/1998 |
| JP | 2000-256458 A | 9/2000 |
| JP | 2003-105079 A | 4/2003 |
| JP | 2003-313289 A | 11/2003 |
| JP | 2004-99877 A | 4/2004 |

* cited by examiner

*Primary Examiner*—Randy Gulakowski
*Assistant Examiner*—Olatunde S Ojurongbe
(74) *Attorney, Agent, or Firm*—Sughrue Mion, PLLC

(57) ABSTRACT

The invention aims at providing a process of subjecting a polyether polymer containing a double metal cyanide complex and/or residue compounds thereof as the metallic impurities to extraction with water to thereby remove the metallic impurities, which enables simpler and complete removal of the impurities; and polyether polymers obtained by the process. This aim is attained by a process for the purification of polyethers characterized by blending (A) a polyether containing a double metal cyanide complex and/or residue compounds thereof with ascorbic acid or a derivative thereof and water and then removing the aqueous phase from the resulting mixture to thereby remove the double metal cyanide and/or the residue compounds.

13 Claims, No Drawings

PROCESS FOR PRODUCTION OF POLYETHERS AND POLYMERS

CROSS REFERENCE TO RELATED APPLICATIONS

This application is a National Stage of International Application No. PCT/JP2005/019857, filed on Oct. 28, 2005, claiming priority based on Japanese Patent Application No. 2004-318604, filed Nov. 1, 2004, the contents of all of which are incorporated herein by reference in their entirety.

TECHNICAL FIELD

The present invention relates to a method of producing a polyether polymer and a polyether polymer.

BACKGROUND ART

Use of a room-temperature hardening composition containing a polyether polymer containing hydrolyzable silicon groups and a silanol condensation catalyst, for example as sealant or adhesive, is well known and useful industrially. An example of the method of producing such a hydrolyzable silicon group-containing polyether polymer is to produce a polyether polymer having terminal OH groups, convert the terminal OH groups to olefins, and hydrosilylate the olefin with a hydrolyzable silicon group-containing hydrosilane compound.

However, if an oxidative impurity is present in the unsaturated group-containing polyether prepared by conversion of the terminal OH groups, the impurity inhibits the following hydrosilylation reaction in the method. For prevention of such a reaction inhibition known is a method of advancing the hydrosilylation reaction without problem by decomposing the oxidative impurity present in the unsaturated group-containing polyether with ascorbic acid (see Patent Document 1).

On the other hand, a method of polymerizing an alkyleneoxide by using an alkali metal catalyst such as KOH, a double metal cyanide complex catalyst as a catalyst or the like has been known as a method of producing polyether polymers having terminal OH groups. In such a polymerization method, the catalyst used in polymerization and the residue thereof are removed from the system by a method suitable for the system.

For example, a method of using a double metal cyanide complex gives a polymer having a number-average molecular weight of 8,000 or more and a narrow molecular weight distribution. A curable resin composition containing the hydrolyzable silicon group-containing polyether polymer prepared by such a method is useful, for making the hardened product more flexible, reducing the viscosity of the composition, and making the composition more processable.

The double metal cyanide complexes are removed, for example, by water extraction (see for example Patent Document 2). However, vigorous agitation of the polyether polymer and water for sufficient contact results in emulsification of the system containing the polymer substance, demanding an extended period for separation of the polyether polymer from water after agitation and also a larger facility. Alternatively, gentle agitation for prevention of emulsification also caused a problem of insufficient extraction of metal impurities.

Alternatively, methods of adding a chelating agent such as ethylenediamine tetraacetic acid (EDTA) were also proposed (see for example Patent Document 3). These methods resulted in residual of a chelating agent such as EDTA in the polymer, which functions as a hydrosilylation reaction inhibitor, and thus had a disadvantage of demanding complete removal of EDTA before hydrosilylation.

Patent Document 1: Japanese Unexamined Patent Publication No. 10-212349
Patent Document 2: Japanese Unexamined Patent Publication No. 2003-105079
Patent Document 3: Japanese Unexamined Patent Publication No. 06-200013

DISCLOSURE OF THE INVENTION

Problems to be Solved by the Invention

An object of the present invention is to provide a simpler method of removing a double metal cyanide complex and/or the residual compound thereof from a polyether polymer containing the same by water extraction more effectively and a polymer obtained by the processing.

Another object of the present invention is to provide a method of reducing inhibition of the hydrosilylation reaction even when the double metal cyanide complex and/or the residual compound thereof are not removed completely.

Means to Solve the Problems

After intensive studies to solve the problems above, the inventors have achieved the objects above.

Thus, the present invention relates to:

(1) A method of producing a polyether, including a purification step, characterized by adding ascorbic acid or the derivative thereof and water to a polyether (A) containing double metal cyanide complex and/or the residual compound thereof and removing the aqueous phase from the mixture;

(2) A method of producing an unsaturated group-containing polyether, including a purification step, characterized by adding ascorbic acid or the derivative thereof and water to an unsaturated group-containing polyether (B) containing a double metal cyanide complex and/or the residual compound thereof and removing the aqueous phase from the mixture;

(3) A method of producing a polyether, including a purification step, characterized by adding an organic solvent, ascorbic acid or the derivative thereof and water to a polyether (A) containing double metal cyanide complex and/or the residual compound thereof and removing the aqueous phase from the mixture;

(4) A method of producing a polyether, including a purification step, characterized by adding an organic solvent, ascorbic acid or the derivative thereof and water to an unsaturated group-containing polyether (B) containing a double metal cyanide complex and/or the residual compound thereof and removing the aqueous phase from the mixture;

(5) The method of producing a polyether according to claim 2 or 4, characterized by using, as the component (B), an unsaturated group-containing polyether prepared by alkoxylating with alkali metal compounds the terminal hydroxyl groups of the terminal hydroxyl group-containing polyether polymer obtained in polymerization in the presence of a double metal cyanide complex catalyst and allowing it to react with an unsaturated group-containing compound represented by Formula (1):

$$H_2C=C(R^2)-R^1-Y \text{ or } H(R^2)C=CH-R^1-Y \qquad (1)$$

(wherein, $R^1$ represents a bivalent organic group having 1 to 20 carbon atoms containing one or more atoms selected from the group consisting of hydrogen, oxygen, and nitrogen as its constituent atoms; $R^2$ represents a hydrogen atom or a hydrocarbon having 10 or less carbon atoms; and Y represents a halogen atom.);

(6) The method of producing a polyether according to any one of (1) to (5), wherein a polyether having a peroxide content of 30 ppm or less, as determined by iodine-thiosulfate titration, before addition of ascorbic acid and/or the derivative thereof is used;

(7) A hydrolyzable silicon group-containing polyether polymer, prepared in hydrosilylation reaction of an unsaturated group-containing polyether (C) obtained by the production method according to (2), (4), or (6) with a silane compound represented by the General Formula (2):

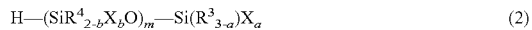

$$H\text{—}(SiR^4{}_{2-b}X_bO)_m\text{—}Si(R^3{}_{3-a})X_a \quad (2)$$

(wherein, $R^3$ and $R^4$ each independently represent an alkyl group having 1 to 20 carbon atoms, an aryl group having 6 to 20 carbon atoms, an aralkyl group having 7 to 20 carbon atoms or a triorganosiloxy group represented by $(R')_3SiO\text{—}$; the two or more groups $R^3$ or $R^4$, when present, may be the same as or different from each other; R' represents a monovalent hydrocarbon group having 1 to 20 carbon atoms, and the three groups R' may be the same as or different from each other; X represents a hydroxyl or hydrolytic group; the two or more groups X, when present, may be the same as or different from each other; a is 0, 1, 2 or 3; b is 0, 1, or 2; the numbers b in m groups $(SiR^4{}_{2-b}X_bO)$ may be the same as or different from each other; m is an integer of 0 to 19; however, the following formula is satisfied: a+Sb=:1); and (8) The hydrolyzable silicon group-containing polyether polymer according to (7), wherein the silane compound is a compound represented by the following General Formula (3):

$$H\text{—}SiR^3{}_{3-c}X_c \quad (3)$$

(wherein, $R^3$, X is the same as that above; and c is 1, 2 or 3).

The amount of peroxides is generally determined quantitatively according to the iodine-thiosulfate titration method described in R. M. Johnson and I. W. Siddiqi, The Determination Of Organic Peroxides, Pergamon Press, London, 1970 Chp. 3, for example, by using Model HP-10B kit manufactured by CHE Metrics Inc. The present invention is effective even at a peroxide amount of 30 ppm or less and sufficiently effective even at a peroxide amount of 20 ppm or less, or further 10 ppm or less.

ADVANTAGEOUS EFFECTS OF THE INVENTION

In extracting and removing metal impurities from a metal impurity-containing polyether polymer by water extraction, it becomes easier to remove metal impurities by addition of ascorbic acid or the derivative thereof. It is also possible to obtain a polyether polymer lower in metal content.

BEST MODE OF CARRYING OUT THE INVENTION

Hereinafter the present invention will be described in detail, and the main chain structure of the polyether (A) for use in the invention is not particularly limited if it is a polymer having a structure represented by —R—O— as its recurring unit, wherein R represents a bivalent organic group having 1 to 20 carbon atoms and containing one or more atoms selected from the group consisting of hydrogen, oxygen, and nitrogen as its constituent atoms. The polymer may be a homopolymer wherein all recurring units are the same or a copolymer containing two or more kinds of recurring units. In addition, it may have branched structures on the main chain.

Typical examples of the recurring units represented by —R—O— include —$CH_2CH_2O$—, —$CH(CH_3)CH_2O$—, —$CH(C_2H_5)CH_2O$—, —$C(CH_3)_2CH_2O$—, —$CH_2CH_2CH_2CH_2O$—, and the like.

The component (A) according to the present invention is prepared by ring opening polymerization of an alkyleneoxide such as ethyleneoxide, propyleneoxide, a-butyleneoxide, β-butyleneoxide, hexeneoxide, cyclohexeneoxide, styreneoxide or a-methylstyreneoxide, and an alkyl, allyl or aryl glycidylether, specifically a substituted or unsubstituted epoxy compound having 2 to 12 carbon atoms such as methyl glycidylether, ethyl glycidylether, isopropyl glycidylether, butyl glycidylether, allyl glycidylether, or phenylglycidylether, in the presence of a double metal cyanide catalyst by using a bivalent alcohol or polyvalent alcohol, such as ethylene glycol, propylene glycol, butanediol, hexamethylene glycol, methallyl alcohol, hydrogenated bisphenol A, neopentylglycol, polybutadiene diol, diethylene glycol, triethylene glycol, polyethylene glycol, polypropylene glycol, polypropylene triol, polypropylene tetraol, dipropylene glycol, glycerol, trimethylolmethane, trimethylolpropane, or pentaerythritol, or a hydroxyl group-containing various polymer at initiator.

Examples of the double metal cyanide catalysts include $Zn_3[Fe(CN)_6]_2$, $Zn_3[Co(CN)_6]_2$, $Fe[Fe(CN)_6]$, $Fe[Co(CN)_6]$ and the like. More preferable is a compound having $Zn_3[Co(CN)_6]_2$ (i. e., zinc hexacyanocobaltate complex) as the catalyst skeleton and organic ligands coordinated thereto.

Such a catalyst is prepared, for example, by allowing a metal halide salt to react with an alkali metal cyanometalate in water and then an organic ligand to coordinate the reaction product thus formed. The metal in the metal halide salt is preferably Zn (II) or Fe (II), particularly preferably Zn (II). The metal halide salt is particularly preferably zinc chloride. The metal for the cyanometalate in the alkali metal cyanometalate is preferably Co (III) or Fe (III), particularly preferably Co (III). The alkali metal cyanometalate is preferably potassium hexacyanocobaltate. The organic ligand is preferably an alcohol and/or an ether. Favorable is one or more solvents selected from alcohols such as tert-butyl alcohol, ethanol, sec-butyl alcohol, n-butyl alcohol, isobutyl alcohol, tert-pentyl alcohol, isopentyl alcohol and isopropyl alcohol; and ethers such as ethylene glycol dimethylether (hereinafter, glyme), diglyme (diethylene glycol dimethylether), triglyme (triethylene glycol dimethylether), dioxane, and polyethers having a number-average molecular weight of 150 to 5000. Particularly favorable among them are tert-butyl alcohol and/or glyme.

An antioxidant may be added to the polyether (A) obtained, for prevention of oxidative degradation of the polyether. Examples of the antioxidant for use include phenol-based antioxidants such as 2,6-di-tert-butyl-p-cresol, 2,6-di-tert-butylphenol, 2,4-dimethyl-6-tert-butylphenol, 2,2'-methylene bis(4-methyl-6-tert-butylphenol), 4,4'-butylidene bis(3-methyl-6-tert-butylphenol), 4,4'-thiobis(3-methyl-6-tert-butylphenol), tetrakis{methylene-3(3,5-di-tert-butyl-4-hydroxyphenyl)prop ionato} methane, and 1,1,3-tris(2-methyl-4-hydroxy-5-tert-butylphenyl)butane; and the like.

The ascorbic acid or the derivatives thereof (B) for use in the present invention include L-ascorbic acid; its structural isomer isoascorbic acid; the ester derivatives thereof (such as L-ascorbyl palmitate, L-ascorbyl stearate, L-ascorbyl 2-ethylhexanoate, isoascorbyl palmitate, isoascorbyl stearate, and isoascorbyl 2-ethylhexanoate); the phosphate ester derivatives thereof (such as L-ascorbyl monophosphate, L-ascorbyl diphosphate, L-ascorbyl triphosphate, isoascorbyl monophosphate, isoascorbyl diphosphate, and isoascorbyl triphosphate); the ether derivatives thereof (specifically, L-ascorbic acid-2-glucoside and isoascorbic acid-2-glucoside); and the alkali-metal salts thereof such as of sodium or potassium; the alkali-earth metal salts thereof such as of magnesium, calcium or barium; and the various metal salts thereof such as of a polyvalent metal salt like aluminum and the like, and more preferable is L-ascorbic acid, isoascorbic acid or the metal salt thereof.

Favorable for introducing an unsaturated group into the hydroxyl group-containing polyether polymer is, for example, a method of converting the hydroxyl group of the polyether polymer into —OM (M: Na or K) by metallation and preparing an unsaturated group-containing polyether in reaction thereof with an organic halogen compound represented by General Formula (1):

$$H_2C=C(R^2)—R^1—Y \text{ or } H(R^2)C=CH—R^1—Y \qquad (1)$$

(wherein, $R^1$ represents a bivalent organic group having 1 to 20 carbon atoms and containing one or more atoms selected from the group consisting of hydrogen, oxygen, and nitrogen as its constituent atoms; $R^2$ represents a hydrogen atom or a hydrocarbon having 10 or less carbon atoms; and Y represents a halogen atom).

The organic halogen compound is most preferably allyl chloride or methallyl chloride.

When the polyether is prepared by polymerization by using a compound having an active hydrogen group and an unsaturated bond in the molecule such as allyl alcohol as the initiator described above, it is possible to obtain the unsaturated group-containing polyether without the operation above.

The purification method by water extraction according to the present invention consists of vigorous agitation of an unsaturated group-containing polyether, water, and ascorbic acid or the derivative thereof, centrifugal or static separation of the aqueous phase from the organic phase, and separation of the organic phase. A solvent may be used or may not be used then.

The blending ratio of the unsaturated group-containing polyether to water is not particularly limited if the metal impurities are removed to a desirable level and the organic phase is separated, but an excessively smaller ratio makes separation of the aqueous phase from the organic phase more difficult and the metal impurity less extractable. Alternatively, an excessively large ratio causes a problem of expansion of the apparatus. Thus, water is used preferably in an amount of 10 to 1,000 wt parts, more preferably 20 to 500 wt parts, with respect to 100 wt parts of the unsaturated group-containing polyether.

An organic solvent may be added when the aqueous phase and the organic phase are less separable. Examples of the organic solvents include ketone solvents, aliphatic, alicyclic and aromatic hydrocarbon solvents, ether solvent, the halides thereof, and the like. Typical examples thereof include, but are not limited to, butanes, pentanes, hexanes, heptanes, octanes, nonanes, decanes, dodecanes, cyclohexane, cyclopentane, benzene, toluene, xylenes, methylether, ethylether, isopropylether, methylene chloride, methyl chloroform, carbon tetrachloride, dichlorodifluoromethane, perchloroethylene, benzene- and toluene-based solvents substituted with one or more atoms of chlorine, bromine and/or iodine, and the like. These additional solvents may be used alone or in combination of two or more.

When an organic solvent is added, the amount of the organic solvent added is not particularly limited, if it is sufficient for dissolving the polyether (component (A) or (B)) and lowering the viscosity of the solution, but an excessively larger blending rate of the organic solvent is more undesirable industrially, because it demands expansion of the tank capacity and the facility for distillation and recovery of the organic solvent, although there is some advantage in reduction of viscosity. Normally, the organic solvent is used preferably in an amount of 10 to 1,000 wt parts, more preferably 20 to 500 wt parts, with respect to 100 wt parts of the polyether (component (A) or (B)).

The silane compound used for hydrosilylation of the unsaturated group-containing polyether is preferably a compound having one or more Si—H groups in the molecule. Typical examples thereof include the compounds represented by the following General Formula (2):

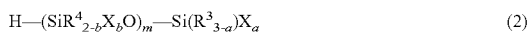

$$H—(SiR^4{}_{2-b}X_bO)_m—Si(R^3{}_{3-a})X_a \qquad (2)$$

(wherein, $R^3$ and $R^4$ each independently represent an alkyl group having 1 to 20 carbon atoms, an aryl group having 6 to 20 carbon atoms, an aralkyl group having 7 to 20 carbon atoms or a triorganosiloxy group represented by $(R')_3SiO—$; the multiple groups $R^3$ or $R^4$, when present, may be the same as or different from each other; R' represents a monovalent hydrocarbon group having 1 to 20 carbon atoms, and the three groups R' may be the same as or different from each other; X represents a hydroxyl or hydrolytic group; the two or more groups X, when present, may be the same as or different from each other; a is 0, 1, 2 or 3; b is 0, 1, or 2; the numbers b in m groups $(SiR^4{}_{2-b}X_bO)$ may be the same as or different from each other; m is an integer of 0 to 19. However, the following formula is satisfied: a+Σb=1).

A silicon atom may be bound to 1 to 3 hydrolytic or hydroxyl groups, and (a+Σb) is preferably in the range of 1 to 5. When two or more hydrolytic or hydroxyl groups are bound to a reactive silicon group, they may be the same as or different from each other.

The compounds represented by General Formula (3) are favorable because they are readily available.

$$H—SiR^3{}_{3-c}X_c \qquad (3)$$

(wherein $R^3$, X is the same as that above; c is 1, 2 or 3.)

Typical examples thereof include halogenated silanes such as trichlorosilane, methyldichlorosilane, dimethylchlorosilane, phenyldichlorosilane, and trimethylsiloxymethylchlorosilane; alkoxysilanes such as trimethoxysilane, triethoxysilane, methyl diethoxysilane, methyldimethoxysilane, phenyldimethoxysilane, trimethylsiloxymethylmethoxysilane, and trimethylsiloxydiethoxysilane; acyloxysilanes such as methyl diacetoxysilane, phenyl diacetoxysilane, triacetoxysilane, trimethylsiloxymethyl acetoxysilane, and trimethylsiloxydiacetoxysilane; ketoximate silanes such as bis(dimethyl ketoximato)methylsilane, bis(cyclohexylketoximato)methylsilane, bis(diethylketoximato) trimethylsiloxysilane, bis(methylethylketoximato)methylsilane, and tris(acetoxymato)silane; alkenyloxysilanes such as methylisopropenyloxysilane; and the like. Among them, alkoxysilanes are particularly preferably, and among the alkoxy groups, a methoxy group is particularly preferable.

The hydrosilylation reaction in the present invention is carried out normally at a temperature in the range of 10 to 150° C., more preferably at 20 to 120° C., and most preferably 40 to 100° C.; and solvents such as benzene, toluene, xylene, tetrahydrofuran, methylene chloride, pentane, hexane, and heptane are used as needed for regulation of reaction temperature and adjustment of the viscosity of reaction system.

For example, a metallocomplex catalyst selected from Group VIII transition metal elements such as platinum and rhodium is used as the catalyst used in reaction of the polyether polymer having an introduced unsaturated bond with the hydrolyzable silicon group-containing compound. Typical examples thereof for use include $H_2PtCl_6 \cdot 6H_2O$, platinum-vinylsiloxane complex, platinum-olefin complex, $RhCl(PPh_3)_3$, and the like; but $H_2PtCl_6 \cdot 6H_2O$ and platinum-vinylsiloxane complex are particularly preferable from the point of hydrosilylation reactivity. The platinum-vinylsiloxane complex is a general term for the compounds containing a platinum atom and its ligands vinyl-containing siloxane, polysiloxane, or cyclic siloxane groups in the molecule, and typical examples of the ligands include 1,1,3,3-tetramethyl 1,3-divinyldisiloxane and the like. The amount of the catalyst amount used is not particularly limited, but the platinum catalyst is normally, preferably used in an amount of $10^{-1}$ to $10^{-8}$ mole with respect to 1 mole of the alkenyl group.

The hydrolyzable silicon group-containing polyether polymer thus prepared hardens by atmospheric moisture at room temperature in the presence of a curing catalyst, giving a film highly adhesive to metal, glass, and others, and thus, is useful as a film composition, sealing composition, paint composition, or adhesive composition for building, airplane, automobile, and others. Any one of known silanol condensation catalyst may be used as the curing catalyst. These catalysts may be used alone or in combination of two or more.

Various additives including plasticizer, filler, adhesiveness improver such as aminosilane, and dehydrating agent may be added as needed to the hydrolyzable silicon group-containing polyether polymer according to the present invention.

EXAMPLES

The present invention will be described in detail with reference to typical Examples below, but it should be understood that the present invention is not limited thereby.

The amount of the peroxide used in the following Examples was determined quantitatively according to the following method.

First, approximately 5 g of a sample was weighed in a ground Erlenmeyer flask, and dissolved in a mixture of 50 ml of chloroform and 20 ml of acetic acid added thereto. The flask was then substituted with nitrogen gas; after addition of 1 ml of saturated potassium iodide solution, the flask was sealed immediately and stirred approximately for 1 minute; and the amount of the peroxide as $H_2O_2$ in the solution was determined by titrating the solution with 0.01 N sodium thiosulfate solution by using a starch reagent solution as the indicator.

Preparative Example 1

Propyleneoxide was allowed to react in ring-opening polymerization by using polypropylene glycol having a number-average molecular weight of 3,000 as the initiator and a zinc hexacyanocobaltate glyme complex as the catalyst, to give a terminal hydroxyl group-containing polyether polymer (a) having a number-average molecular weight of 12,000 that contains metal compounds of the catalyst and/or the residue as impurities. The peroxide amount of the polyether obtained (a) was 10 ppm or less.

Preparative Example 2

Then, a methanol solution containing NaOMe in an amount of 1.2 equivalences with respect to the hydroxyl group of the polyether (a) prepared by the Preparative Example 1 was added thereto, and the methanol is evaporated; and allyl chloride in an amount of 1.5 equivalences with respect to the hydroxyl group was added then, allowing allylation of the terminal hydroxyl group, to give an unsaturated group-containing polyether (b) that contains the metal compound as impurities.

Preparative Example 3

Polypropylene glycol having a number-average molecular weight of 3,000 polymerized by using a caustic alkali as a catalyst and dichloromethane were allowed to react with each other in molecule chain-extending reaction in the presence of alkali, to give a terminal hydroxyl group-containing polyether polymer having a number-average molecular weight of 9,000. Then, a methanol solution containing NaOMe in an amount of 1.2 equivalences with respect to the hydroxyl group of the terminal hydroxyl group-containing polyether polymer was added thereto, and the methanol is evaporated; and allyl chloride in an amount of 1.5 equivalences with respect to the hydroxyl group was added then, allowing allylation of the terminal hydroxyl group, to give an unsaturated group-containing polyether (c).

Example 1

300 g of hexane, 300 g of water, and 50 mg of ascorbic acid were added to 100 g of the terminal hydroxyl group-containing polyether (a) obtained in Preparative Example 1, and the mixture was agitated for 20 minutes. The mixture was left still; the hexane phase was separated; and the hexane was evaporated under reduced pressure. The results of analyzing the metal content in the polyether obtained are shown in Table 1.

Example 2

The unsaturated group-containing polyether (b) obtained in Preparative Example 2 was processed in a similar manner to Example 1. The results of analyzing the metal content in the unsaturated group-containing polyether (d) obtained are shown in Table 1.

Example 3

20 g of water and 25 mg of ascorbic acid were added to 50 g of the unsaturated group-containing polyether (b) obtained in Preparative Example 2, and the mixture was agitated at 90° C. for 30 minutes and then, left still, for separation of the organic phase. The results of analyzing the metal content in the unsaturated group-containing polyether (e) obtained are shown in Table 1.

Comparative Example 1

300 g of hexane and 300 g of water were added to 100 g of the polyether (a) obtained in Preparative Example 1, and the mixture was agitated for 20 minutes. The mixture was left still; the hexane phase was separated; and the hexane was evaporated under reduced pressure. The results of analyzing the metal content in the polyether obtained are shown in Table 1.

Comparative Example 2

The unsaturated group-containing polyether (b) obtained in Preparative Example 2 was processed in a similar manner to Comparative Example 1, and the results of analyzing the metal content in the unsaturated group-containing polyether (f) obtained are shown in Table 1.

Comparative Example 3

20 g of water was added to 50 g of the unsaturated group-containing polyether (b) obtained in Preparative Example 2, and the mixture was stirred at 90° C. for 30 minutes. The mixture was left still and then the organic phase was separated. The results of analyzing the metal content in the unsaturated group-containing polyether (g) obtained are shown in Table 1.

(Evaluation Method)

The content of metals (Zn and Co) in the polyether was determined by ICP emission electroscopic analysis.

4. The results of analyzing the residual allyl-group content in the polymer as determined by NMR are shown in Table 2.

Comparative Example 4

The unsaturated group-containing polyether (f) obtained in Comparative Example 2 was processed in a similar manner to Example 4. The results of analyzing the residual allyl-group content in the polymer as determined by NMR are shown in Table 2.

Comparative Example 5

The unsaturated group-containing polyether (g) obtained in Comparative Example 3 was processed in a similar manner to Example 4. The results of analyzing the residual allyl-group content in the polymer as determined by NMR are shown in Table 2.

TABLE 1

|  |  | Example 1 | Example 2 | Example 3 | Comparative Example 1 | Comparative Example 2 | Comparative Example 3 |
|---|---|---|---|---|---|---|---|
| Polymer used |  | (a) | (b) | (b) | (a) | (b) | (a) |
| Metal content after purification (ppm) | Zn | <0.1 | <0.1 | 1.2 | 3.2 | 4.1 | 5.7 |
|  | Co | <0.1 | <0.1 | 0.5 | 0.9 | 1.1 | 1.4 |

*Metal content before purification
Polyether (a): Zn = 26, Co = 9.2
Polyether (b): Zn = 26, Co = 9.2

Example 4

50 g of the unsaturated group-containing polyether (d) obtained in Example 2 and 1 g of hexane were placed in a 200-ml round-bottomed flask, and the volatile matter was removed at 90° C. under reduced pressure. The flask was then substituted with $N_2$, and 23 μl of a platinum-vinylsiloxane complex (Pt: 1 wt %/isopropanol (hereinafter, IPA)) was added thereto and agitated; and 1.2 g of dimethoxymethylsilane was added dropwise, gradually. The mixed solution was allowed to react at 90° C. for 1 hour, to give a hydrolyzable silicon group-containing polyether polymer. The results of analyzing the residual allyl group content in the polymer obtained (unreacted unsaturated-group rate), as determined by NMR, are shown in Table 2.

Example 5

The unsaturated group-containing polyether (e) obtained in Example 3 was processed in a similar manner to Example 4. The results of analyzing the residual allyl-group content in the polymer as determined by NMR are shown in Table 2.

Reference Example

The unsaturated group-containing polyether (c) obtained in Preparative Example 3 was processed in a similar manner to Comparative Example 1 and then Example 4, except that dimethoxymethylsilane was used in an amount of 1.6 g. The results of analyzing the residual allyl-group content in the polymer as determined by NMR are shown in Table 2.

TABLE 2

|  |  | Example 4 | Example 5 | Comparative Example 4 | Comparative Example 5 | Reference Example |
|---|---|---|---|---|---|---|
| Polymer used |  | (d) | (e) | (f) | (g) | (h) |
| Metal content (ppm) | Zn | <0.1 | 1.2 | 4.1 | 5.7 | — |
|  | Co | <0.1 | 0.5 | 1.1 | 1.4 | — |
| Allyl group residual ratio (%) |  | 0 | 4 | 8 | 40 | 0 |

As apparent from Table 1, the polyethers containing metal impurities that were purified with ascorbic acid (Examples 1 to 3) had a metal content smaller than that of the polyethers purified without ascorbic acid (Comparative Examples 1 to 3) after purification. In particular, the metal impurities in the polyethers of Examples 1 and 2 were removed to the detection limit or less.

The results in Table 2 show that the allyl group residual ratio was lower, i.e., the hydrosilylation reaction proceeded at a higher yield, when the unsaturated group-containing polyethers purified after addition of ascorbic acid are hydrosilylated (Examples 4 and 5) than when the unsaturated group-containing polyether purified without addition of ascorbic acid are hydrosilylated (Comparative Examples 4 and 5).

The invention claimed is:

1. A method of producing a polyether, including a purification step, characterized by removing double metal cyanide complex and/or the residual compound thereof by water extraction, wherein the method comprises: adding ascorbic acid or the derivative thereof and water to a polyether (A) containing double metal cyanide complex and/or the residual compound thereof; separating the resulting mixture to aqueous phase and organic phase, and removing the aqueous phase from the mixture.

2. A method of producing an unsaturated group-containing polyether, including a purification step, characterized by removing double metal cyanide complex and/or the residual compound thereof by water extraction, wherein the method comprises: adding ascorbic acid or the derivative thereof and water to an unsaturated group-containing polyether (B) containing a double metal cyanide complex and/or the residual compound thereof; separating the resulting mixture to aqueous phase and organic phase, and removing the aqueous phase from the mixture.

3. A method of producing a polyether, including a purification step, characterized by removing double metal cyanide complex and/or the residual compound thereof by water extraction, wherein the method comprises: adding an organic solvent and ascorbic acid or the derivative thereof and water to a polyether (A) containing double metal cyanide complex and/or the residual compound thereof, separating the resulting mixture to aqueous phase and organic phase, and removing the aqueous phase from the mixture.

4. A method of producing a polyether, including a purification step, characterized by removing double metal cyanide complex and/or the residual compound thereof by water extraction, wherein the method comprises: adding an organic solvent and ascorbic acid or the derivative thereof and water to an unsaturated group-containing polyether (B) containing a double metal cyanide complex and/or the residual compound thereof, separating the mixture to aqueous phase, and organic phase and removing the aqueous phase from the mixture.

5. The method of producing a polyether according to claim 2, characterized by using, as the component (B), an unsaturated group-containing polyether prepared by alkoxylating with alkali metal compounds the terminal hydroxyl groups of a terminal hydroxyl group-containing polyether polymer obtained by polymerization in the presence of a double metal cyanide complex catalyst, and allowing it to react with an unsaturated group-containing compound represented by Formula (1):

(wherein, $R^1$ represents a bivalent organic group having 1 to 20 carbon atoms containing one or more atoms selected from the group consisting of hydrogen, oxygen, and nitrogen as its constituent atoms; $R^2$ represents a hydrogen atom or a hydrocarbon having 10 or less carbon atoms; and Y represents a halogen atom).

6. The method of producing a polyether according to claim 1, wherein a polyether having a peroxide content of 30 ppm or less, as determined by iodine thiosulfate titration, before addition of ascorbic acid and/or the derivative thereof is used as the polyether (A).

7. The method of producing a polyether according to claim 1, wherein 20 to 500 wt parts of water is used, with respect to 100 wt parts of the polyether (A).

8. The method of producing a polyether according to claim 2, wherein a polyether having a peroxide content of 30 ppm or less, as determined by iodine thiosulfate titration, before addition of ascorbic acid and/or the derivative thereof is used as the polyether (B).

9. The method of producing a polyether according to claim 2, wherein 20 to 500 wt parts of water is used, with respect to 100 wt parts of the polyether (B).

10. The method of producing a polyether according to claim 3, wherein a polyether having a peroxide content of 30 ppm or less, as determined by iodine thiosulfate titration, before addition of ascorbic acid and/or the derivative thereof is used as the polyether (A).

11. The method of producing a polyether according to claim 3, wherein 20 to 500 wt parts of water is used, with respect to 100 wt parts of the polyether (A).

12. The method of producing a polyether according to claim 4, wherein a polyether having a peroxide content of 30 ppm or less, as determined by iodine thiosulfate titration, before addition of ascorbic acid and/or the derivative thereof is used as the polyether (B).

13. The method of producing a polyether according to claim 4, wherein 20 to 500 wt parts of water is used, with respect to 100 wt parts of the polyether (B).

* * * * *